(12) United States Patent
Wüllrich et al.

(10) Patent No.: US 10,730,374 B2
(45) Date of Patent: Aug. 4, 2020

(54) TOP OF A CONVERTIBLE VEHICLE, COMPRISING A HEADLINER ASSEMBLY

(71) Applicant: Webasto SE, Stockdorf (DE)

(72) Inventors: Heinrich Wüllrich, Stockdorf (DE); Nikolaus Linner, Seebruck (DE)

(73) Assignee: Webasto SE, Stockdorf (DE)

( * ) Notice: Subject to any disclaimer, the term of this patent is extended or adjusted under 35 U.S.C. 154(b) by 9 days.

(21) Appl. No.: 16/201,577

(22) Filed: Nov. 27, 2018

(65) Prior Publication Data
US 2019/0160924 A1   May 30, 2019

(30) Foreign Application Priority Data
Nov. 28, 2017 (DE) .................. 10 2017 128 136

(51) Int. Cl.
| | |
|---|---|
| *B60J 7/12* | (2006.01) |
| *B60J 7/00* | (2006.01) |
| *B60J 7/14* | (2006.01) |
| *B60R 13/02* | (2006.01) |

(52) U.S. Cl.
CPC .......... *B60J 7/1204* (2013.01); *B60J 7/0007* (2013.01); *B60R 13/0212* (2013.01)

(58) Field of Classification Search
CPC ........ B60J 7/145; B60J 7/1204; B60J 7/0007; B60J 7/1282; B60J 7/1278; B60J 7/1265; B60J 7/1234; B60J 7/1239
USPC ............. 296/107.01, 107.06, 107.09, 107.15
See application file for complete search history.

(56) References Cited

U.S. PATENT DOCUMENTS

| | | | | |
|---|---|---|---|---|
| 7,677,632 | B2 * | 3/2010 | Schonenbach | B60R 13/0225 296/107.06 |
| 7,677,635 | B2 * | 3/2010 | Brockhoff | B60J 7/0076 296/107.09 |
| 8,167,354 | B2 * | 5/2012 | Haberl | B60J 7/146 296/107.15 |
| 2002/0105206 | A1 * | 8/2002 | Neubrand | B60J 7/1286 296/107.07 |
| 2007/0194596 | A1 * | 8/2007 | Heselhaus | B60J 7/1204 296/107.07 |
| 2009/0015033 | A1 * | 1/2009 | Halbweiss | B60J 7/1265 296/107.19 |
| 2019/0160924 | A1 * | 5/2019 | Wullrich | B60R 13/0212 |
| 2019/0263234 | A1 * | 8/2019 | Wheeland | B60J 7/0007 |

* cited by examiner

*Primary Examiner* — Gregory A Blankenship
(74) *Attorney, Agent, or Firm* — Quarles & Brady LLP (57) ABSTRACT

A top of a convertible vehicle, including a top linkage which can be displaced between a closed and a storage position has a linkage assembly on either side of a vertical longitudinal center plane. Each linkage assembly includes a main multi-bar assembly, which is pivotably mounted on a respective vehicle-attached main bearing, and a front roof link, which pivots relative to the main multi-bar assembly when the linkage assembly is actuated, and is covered with a headliner assembly when the top linkage is in the closed position. The headliner assemblies comprise a front headliner flap which is articulated to the respective front roof link via a link assembly and which can be pivoted between a covering and an uncovering position, in which the front headliner flap is located when the top linkage is in the storage position and in which the respective front roof link is accessible from above.

10 Claims, 9 Drawing Sheets

TOP OF A CONVERTIBLE VEHICLE, COMPRISING A HEADLINER ASSEMBLY

CROSS-REFERENCE TO RELATED APPLICATIONS

This application claims priority to German Patent Application No. 10 2017 128 136.3 filed Nov. 28, 2017, which is incorporated herein by reference in its entirety.

The invention relates to a top of a convertible vehicle having the features of the preamble of claim 1.

A top of this kind is known from practice and comprises a top linkage by means of which a top cover can be spread. To this end, the top linkage can be displaced between a closed position, in which the vehicle interior is covered, and a storage position, in which the vehicle interior is open at the top. When in the storage position, the top linkage together with the top cover is accommodated in a rear-side storage space of the vehicle in question. The top linkage has a linkage assembly on either side of a vertical longitudinal center plane of the top, each linkage assembly being pivotably mounted on a respective vehicle-attached main bearing via a main multi-bar assembly. Additionally, the linkage assemblies each comprise a front roof link which is connected, in particular pivotably, to a front bow and which pivots relative to the associated main multi-bar assembly when the relevant linkage assembly is actuated. When the top linkage is in the closed position, the two bilaterally disposed linkage assemblies are each covered by means of a headliner assembly which is guided outward in the transverse direction of the top as far as to a weather strip assembly which interacts with side windows of the vehicle in question. The top can be what is known as a panel-bow top, which has panel bows disposed between the bilaterally disposed linkage assemblies, said panel bows forming an at least largely continuous support surface for the top cover in the longitudinal direction of the top when the top linkage is in the closed position and their undersides forming a middle portion of the headliner of the top. The headliner assemblies, which cover the linkage assemblies when the top is in the closed position, are laterally adjacent to the panel bows.

In known tops of the kind described above, the headliner assemblies, which cover the lateral linkage assemblies, are being kept in position and brought into their required position relative to the respective linkage assembly via rope systems. Additionally, it is known for the lateral headliner assemblies to each have a rigid covering part which is foxed to a roof link. In a top which is configured as a what is known as a Z-fold top and in which the front bow thus keeps its orientation as the top is being displaced from the closed position into the storage position, the front roof links are disposed forward of the front bow with respect to the orientation of the vehicle in question when the top is in the storage position. However, if rigid covering parts disposed on the front roof links were used for the headliner assemblies, there would be the problem that the top is difficult to hold down in the storage position because a holding-down element cannot be permitted to be in contact with the fabric cover or with the headliner assemblies covering the front roof links since this might lead to visible indentations.

The object of the invention is to provide a top of the kind mentioned above whose front roof links can be used to hold down the top linkage in the storage position.

According to the invention, this object is attained by the top having the features of claim 1.

In the top according to the invention, the headliner assembly is provided with a headliner flap which can be displaced relative to the front roof link between a covering position, in which the front roof link is covered, and an uncovering position, in which the front roof link is accessible from above and can thus be used to secure the top in its storage position by means of a holding-down element or the like which acts on the front roof link. The displacing movement between the covering position and the uncovering position is induced by means of an actuating element. In this way, separate control of the headliner flap is realized. Additionally, the headliner flap helps ensure that a headliner fabric covering the headliner flap can be guided in a defined manner as far as to a lateral weather strip, which, in turn, leads to a clean joint design. Thus, the top according to the invention has an aesthetic appearance at its inside facing the vehicle interior in the area of the headliner assemblies when in the closed position.

In a preferred embodiment of the top according to the invention, in order to ensure that when the top linkage is in the storage position, the headliner flaps are each shifted into an area where collision with another element of the top, such as a front bow, is precluded but still offer an ideal point of attack for a holding-down element at the respective front roof link, the link assemblies via which the headliner flaps are articulated to the front roof links are each designed as a multi-bar assembly, in particular as a four-bar assembly, whose pivot axes run obliquely in relation to a pivot axis of the roof links, causing the headliner flaps to shift in the longitudinal direction and in the transverse direction with respect to the front roof links when the top linkage is actuated. This means that link assemblies of this kind realize kinematics for the headliner flaps or 3D-headliner flaps that are spatially inclined and that are controlled in a clearly defined manner throughout the entire motion cycle of the top linkage.

In a preferred embodiment of the top according to the invention, the actuating elements for the headliner flaps each comprise a coupling rod. Specifically, the coupling rod is connected to a linkage element which moves relative to the respective front roof link when the top linkage is displaced at one side and to a link of the respective four-bar assembly or to the respective headliner flap itself at the other side.

For example, each coupling rod is articulated to a coupling link which serves to pivot the respective front roof link relative to the relevant main multi-bar assembly. For this purpose, the coupling link may be connected to a main link of the main multi-bar assembly and to a connecting link which is articulated to the front roof link.

Alternatively, for driving the link assembly of the headliner flap, the coupling rod can also be connected to a driving link for a panel bow if the top according to the invention is a panel-bow top.

Additionally or alternatively, for displacing the headliner flap between the covering position and the uncovering position, the actuating element can also comprise a cable which is connected to another top element and by means of which a pulling force can be exerted on the headliner flap.

In a specific embodiment of the top according to the invention, the headliner assemblies each comprise a second headliner flap which is pivotably mounted on the respective main multi-bar assembly and whose pivot axis runs preferably diagonally in relation to the pivot axes of the main multi-bar assembly. By means of the second headliner flap, too, the headliner fabric can be guided as far as to a lateral weather strip assembly in a clean and defined manner when the top linkage is in the closed positon, ensuring a clean joint design in this area. By pivoting the second headliner flap during displacement of the top linkage, any tension in the headliner fabric that might lead to damage thereof can be counteracted.

In order to also ensure a defined joint design between the headliner assembly and a lateral weather strip assembly in an area between the headliner flap attached to the front roof link and the second headliner flap, the headliner assembly can further comprise a supporting shell which is rigidly disposed on a middle roof link to which the front roof link is pivotably connected. Through the rigid disposition of the supporting shell to which the headliner fabric is attached as well, the headliner fabric is attached to the top linkage in a sufficiently stable manner regarding displacement of the top between the closed position and the storage position while the respective vehicle is being driven.

Specifically, the top according to the invention is configured as what is known as a Z-fold top, which has a top cover and a front bow whose upper side is disposed at the top both in the closed position and in the storage position of the top linkage, meaning it keeps its orientation.

Additionally, the top according to the invention is preferably a panel-bow top in which multiple panel bows, which form an at least largely continuous support surface for a top cover in the longitudinal direction of the vehicle when the top linkage is in the closed position, are disposed between the bilaterally disposed linkage assemblies. In this case, a front panel bow forms the front bow or the roof tip which can be fixed to the windshield header of the vehicle in question when the top is in the closed position and which is connected to the front roof links.

Other advantages and advantageous embodiments of the subject-matter of the invention are apparent from the description, the drawing, and the claims.

Embodiment examples of a top according to the invention are illustrated in a schematically simplified manner in the drawing and will be explained in more detail in the description below.

Figure 1:
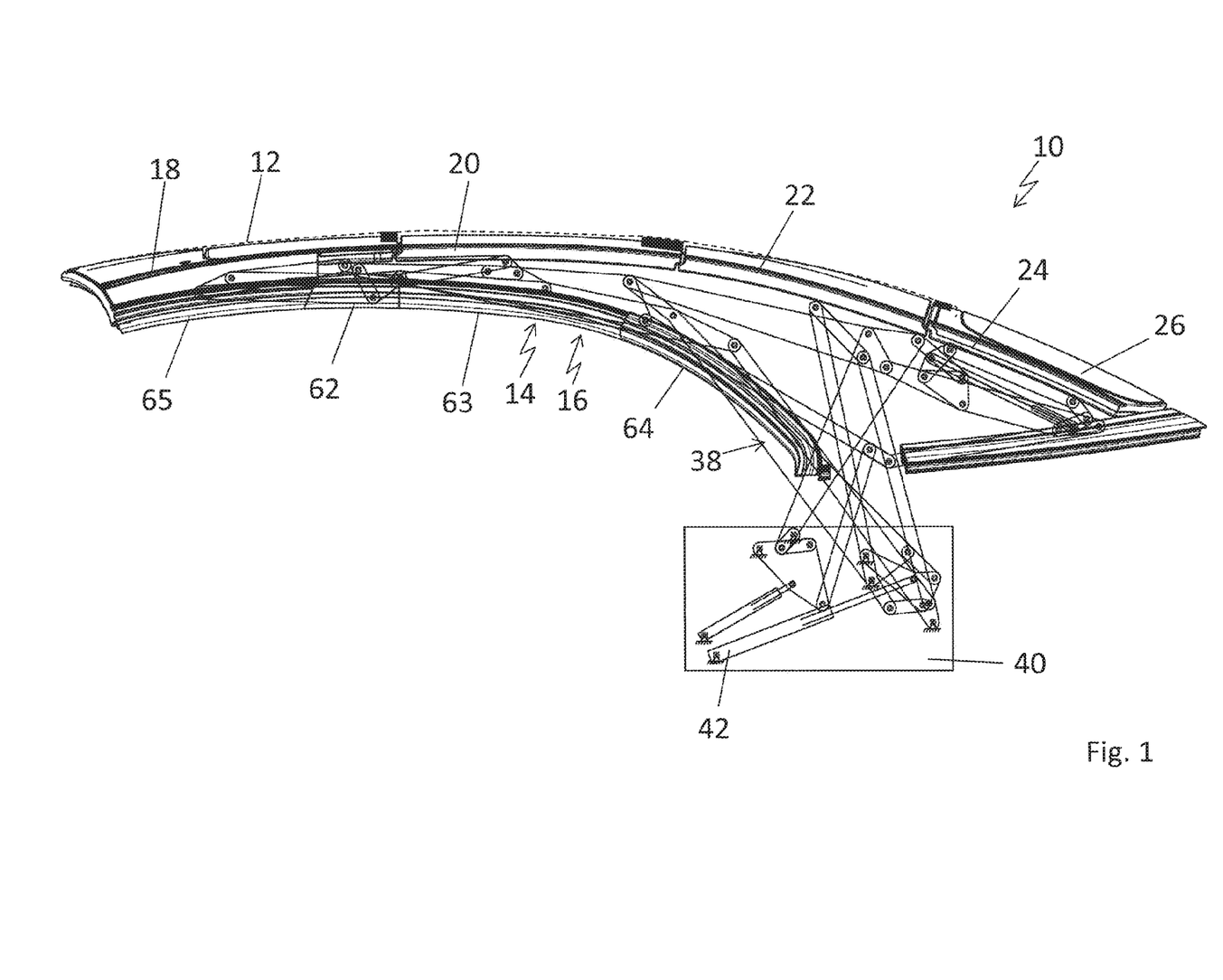
FIG. 1 is a schematic view of a top according to the invention in its closed position.
Figure 2:
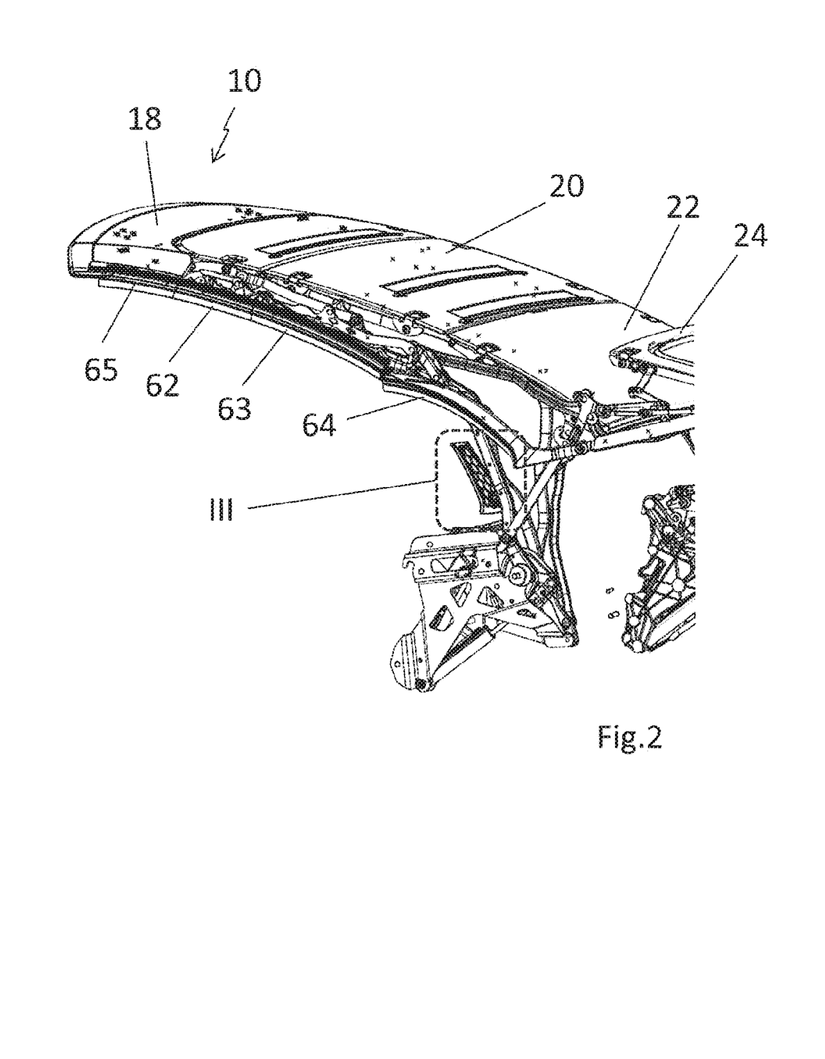
FIG. 2 is a perspective rear view of a top linkage of the top.
Figure 3:
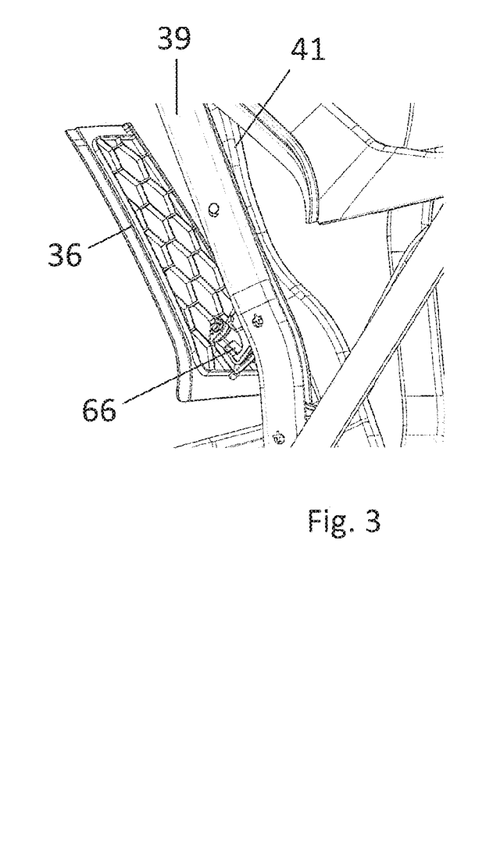
FIG. 3 is an enlarged view of area III in FIG. 2.
Figure 6:
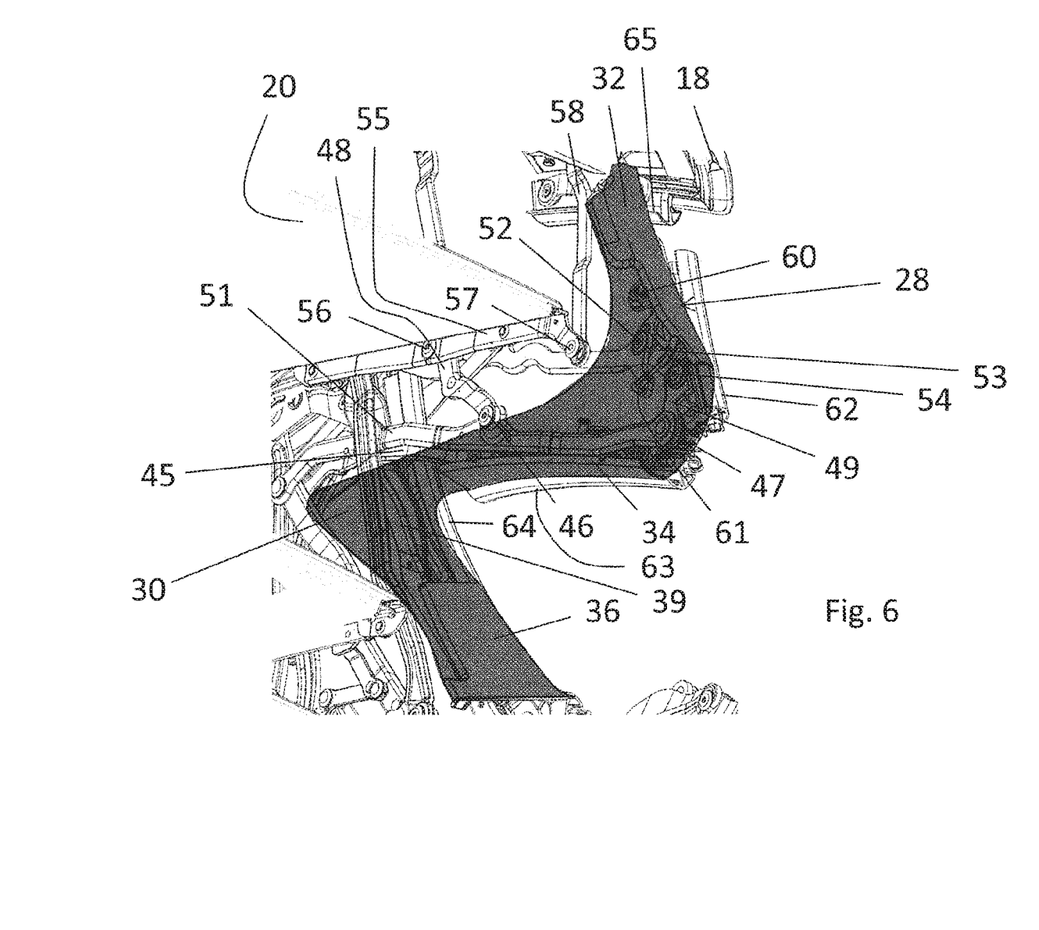
FIG. 6 is a view of the linkage assembly corresponding to FIG. 5, but additionally showing a headliner fabric.
Figure 7:
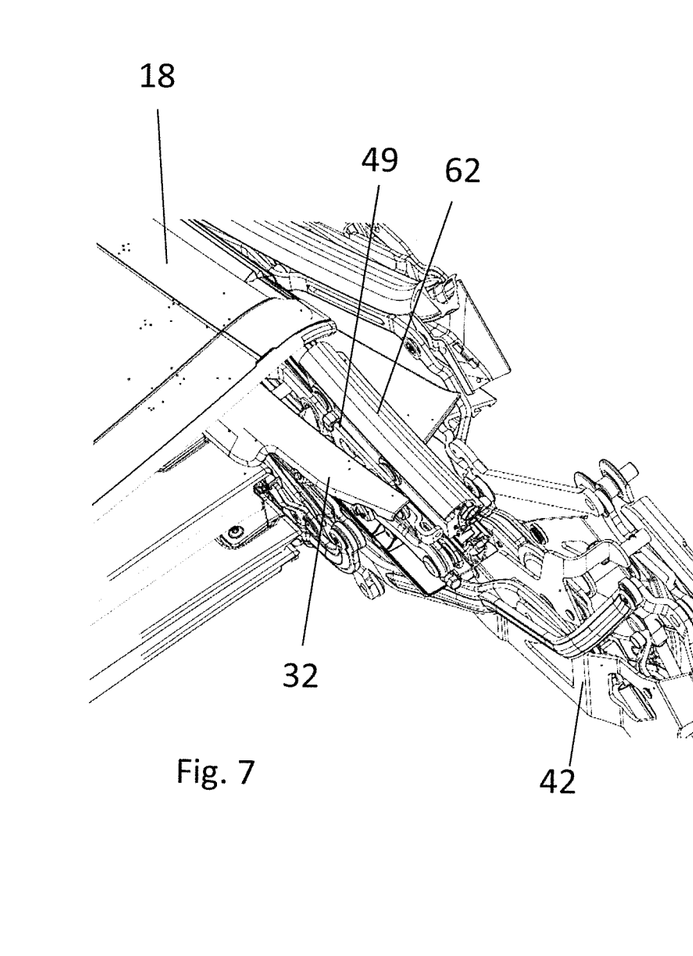
FIG. 7 is a top view of the area of the top illustrated in FIGS. 4 to 6 in the storage position of the top.
Figure 8:
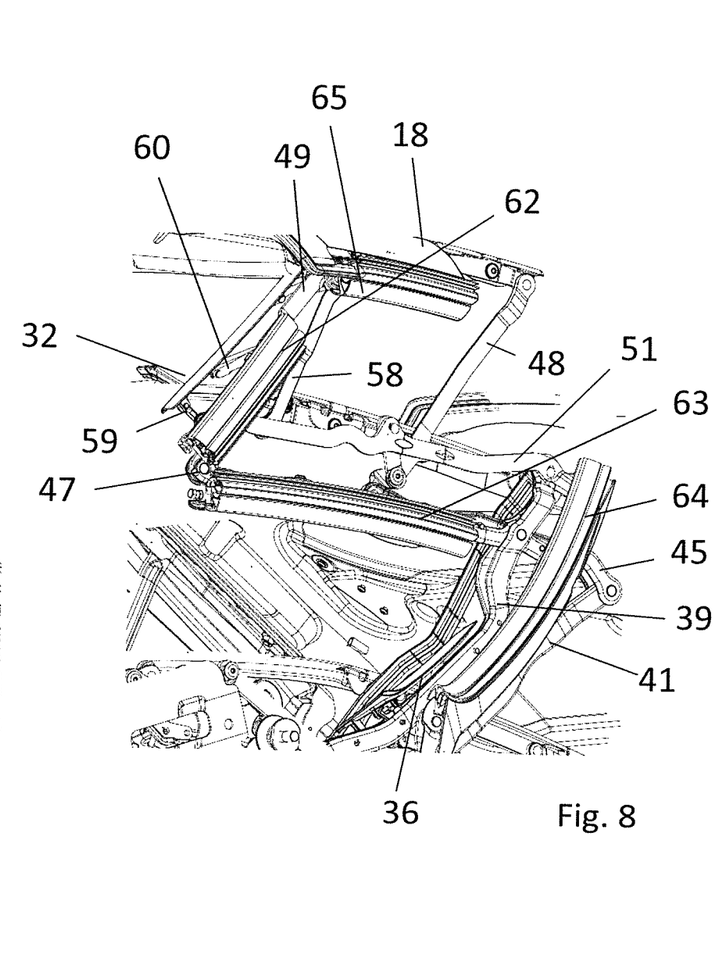
FIG. 8 is an exterior view of the top linkage in an intermediate position.
Figure 9:
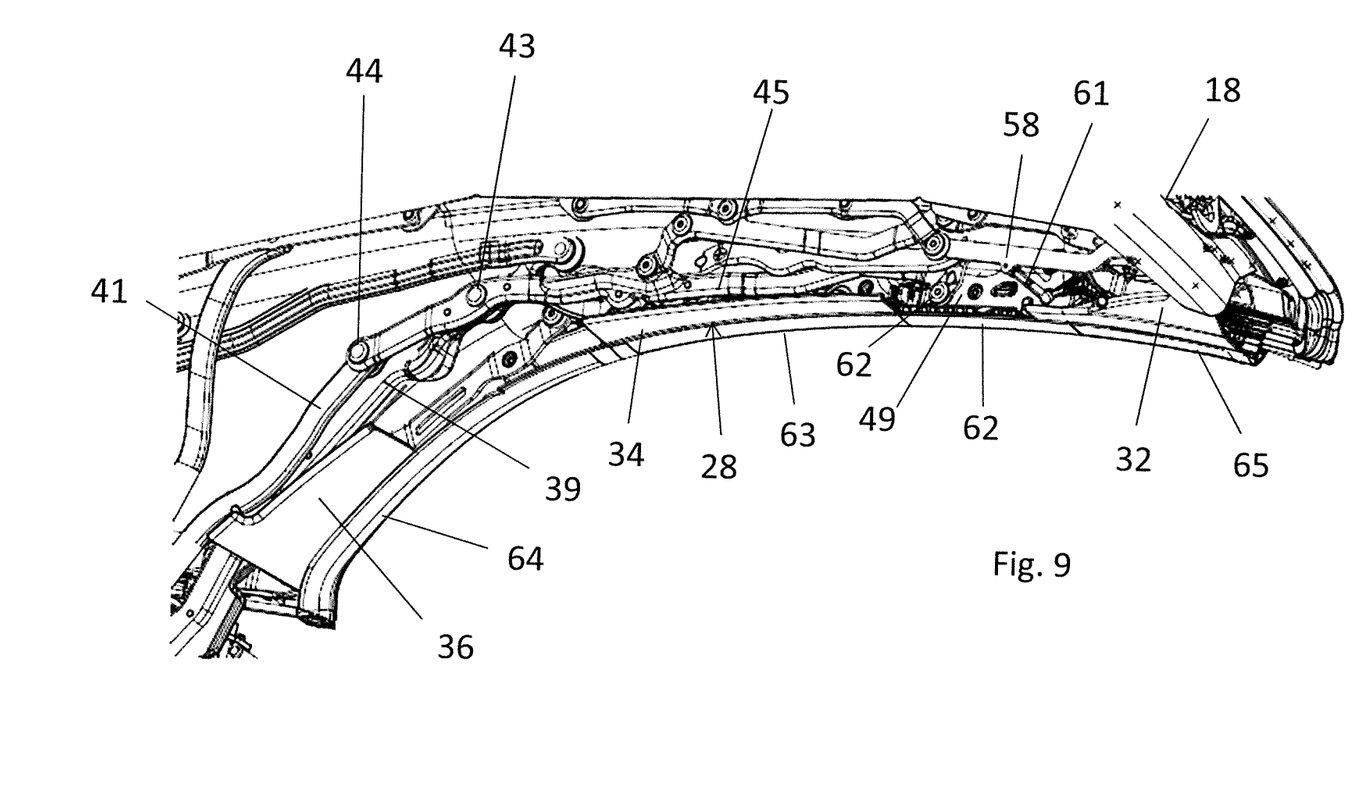
FIG. 9 is a perspective interior view of a linkage assembly of a second embodiment of a top according to the invention in its closed position.
Figure 10:
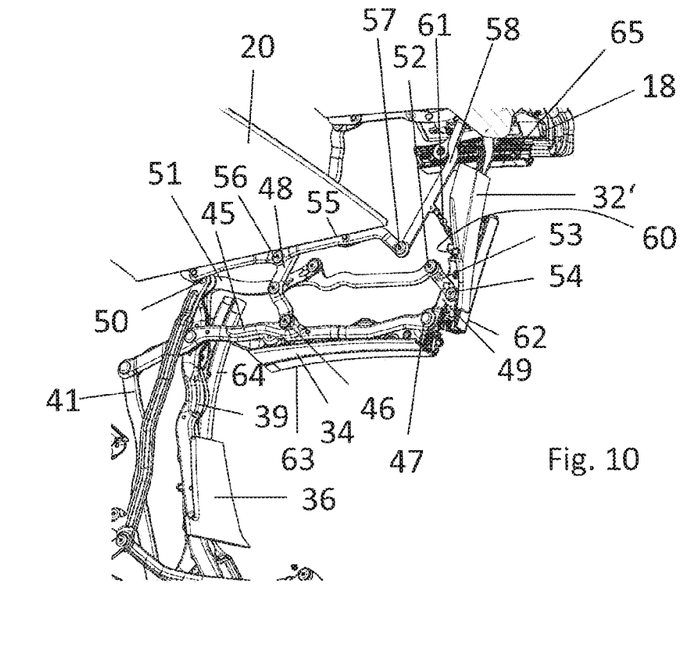
FIG. 10 is a perspective interior view corresponding to FIG. 9, but in an intermediate position during displacement of the top between the closed position and a storage position.
Figure 11:
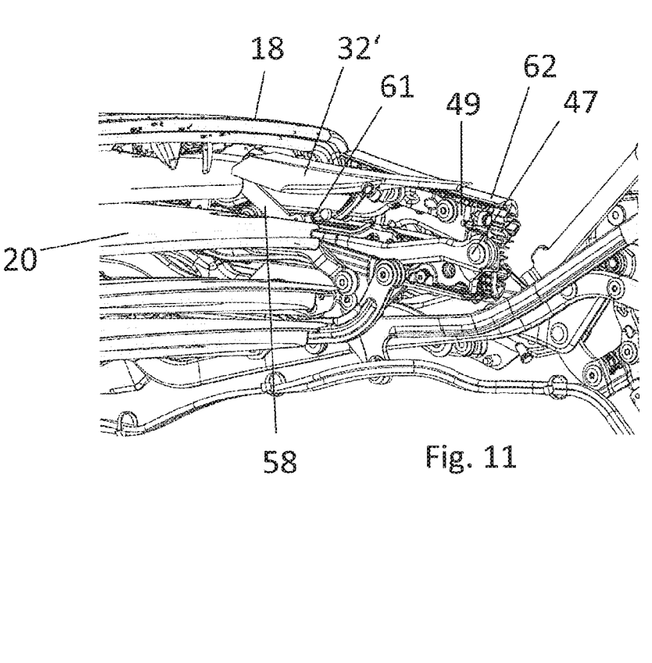
FIG. 11 is a side portion of the top according to FIGS. 9 and 10 in the storage position.
Figure 12:
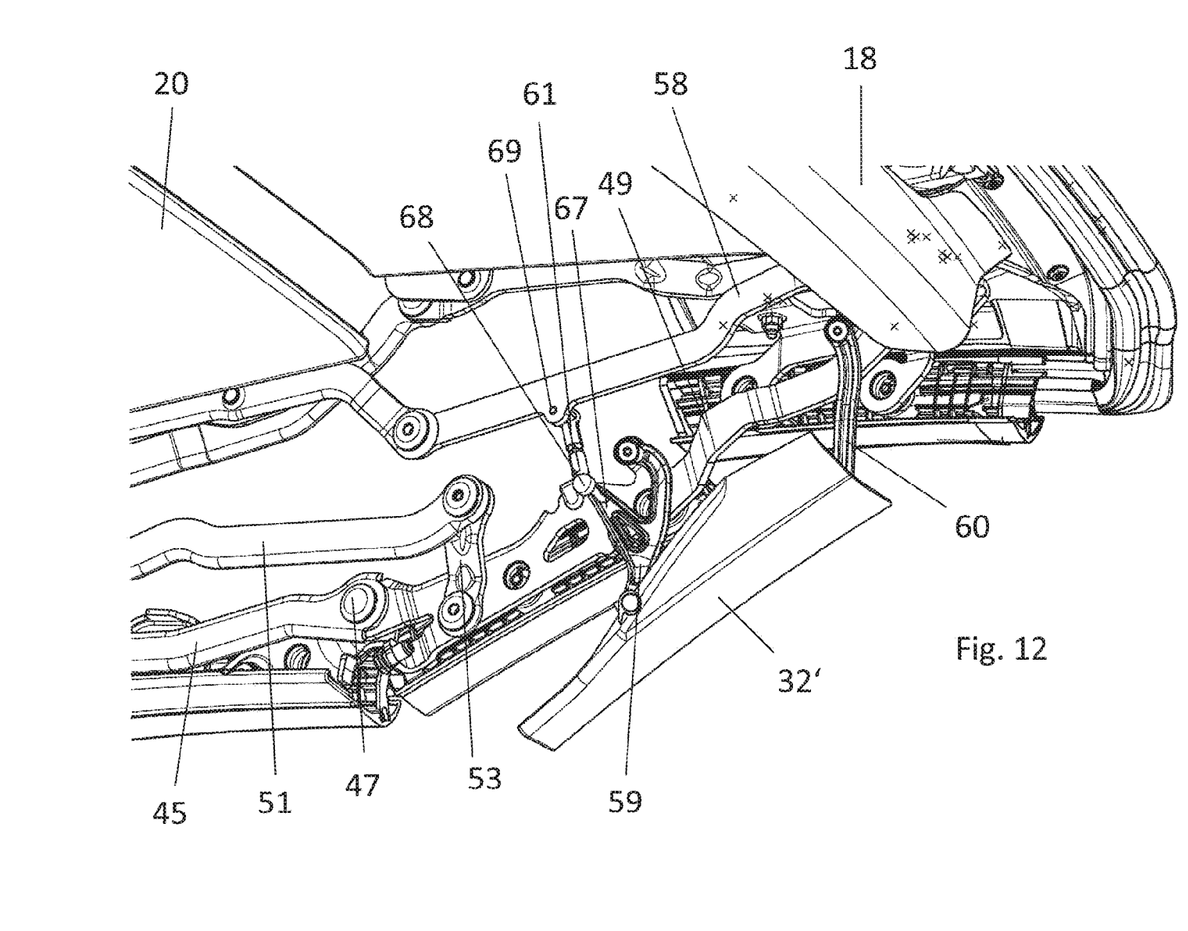
FIG. 12 is an enlarged perspective view of a front-side portion of the top including a headliner flap.

FIGS. 1 to 8 show a top 10 which is configured as a panel-bow top of a convertible vehicle not illustrated in further detail. The top 10 can be displaced between a closed position, which is illustrated in FIG. 1 and in which an interior of the vehicle is covered, and a storage position, which is illustrated in FIG. 7 and in which the interior of the vehicle is open at the top. When in the storage position, the top 10 is accommodated in a rear-side top storage box of the vehicle in question.

The top 10 comprises a top cover 12, which is illustrated by a dashed line in FIG. 1 and formed by a foldable waterproof fabric. For spanning the top cover 12, the top 10 comprises a top linkage 14 which has a linkage assembly 16 on either side of a vertical longitudinal center plane. The bilaterally disposed linkage assemblies 16 are mirrorsymmetrical to each other with respect to a vertical longitudinal center plane of the top, which is why only the linkage assembly disposed on the left with respect to the direction of forward travel of the vehicle in question will be referred to in the following description. The linkage assembly disposed on the right with respect to the direction of forward travel of the vehicle is designed correspondingly and is readily apparent from the following description as well.

For the sake of completeness, it is to be noted that levers and links that are located in different planes, i.e. behind each other and next to each other, are all projected into the drawing plane in FIG. 1, which is why they might intersect in the drawing.

The linkage assemblies 16 serve to actuate four panel bows 18, 20, 22 and 24 which are configured in the manner of rigid roof shells and which form a substantially continuous support surface for the top cover 12 in the longitudinal direction of the vehicle when in the closed position, which is illustrated in FIG. 1. When the top 10 is in the closed position, the four panel bows 18, 20, 22 and 24 are disposed one behind the other in the longitudinal direction of the top. Panel bow 14 forms a front bow which can be fixed to the windshield header of the vehicle in question when the top 10 is in the closed position. Panel bow 20 forms a front middle bow whose front edge is adjacent to the front bow. Panel bow 22 forms rear middle bow whose front edge is adjacent to the front middle bow. Panel bow 24 forms a rear window bow which accommodates a rear window 26. In the storage position, the panel bows 18, 20, 22 and 24 are substantially stacked on top of each other.

The top cover 12 is attached to the upper side of panel bow 18, to the rear edge portion of panel bow 20 and to the front edge portion of panel bow 24. The top cover 12 is not attached to panel bow 22. Instead, the top cover 12 rests loosely on panel bow 22 without fixation when the top 10 is in the closed position. The inner sides of the panel bows 18, 20, 22 and 24 form a middle portion of a headliner of the top.

Figure 4:
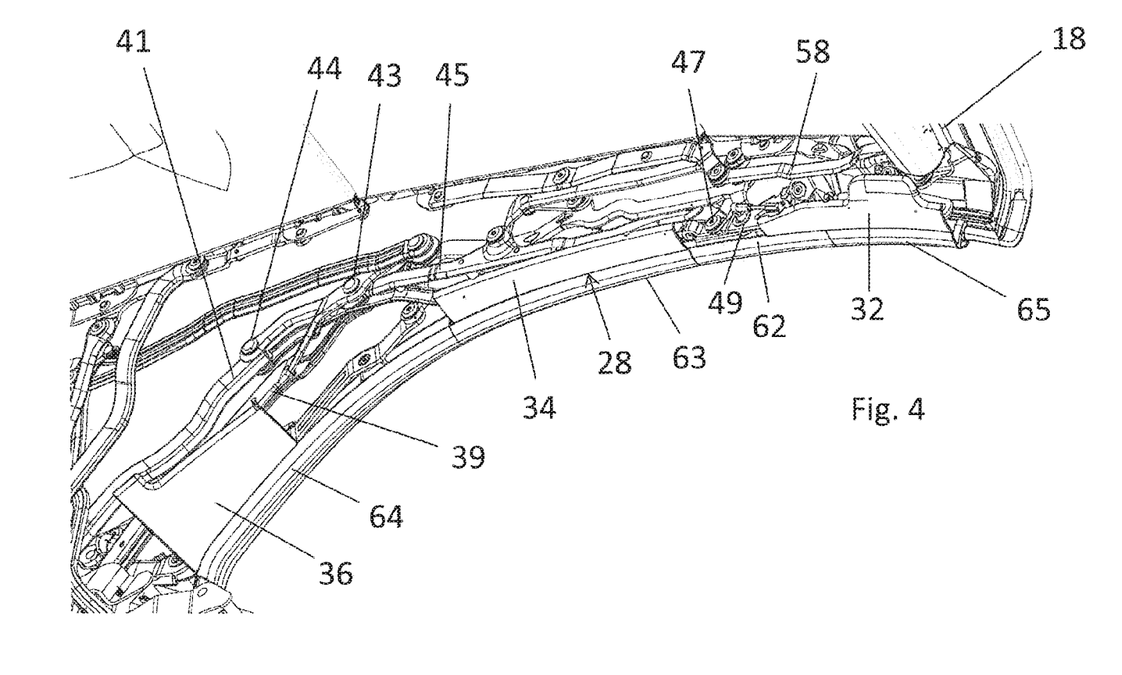
FIG. 4 is a perspective interior view of the top linkage in the area of a lateral linkage assembly.
Figure 5:
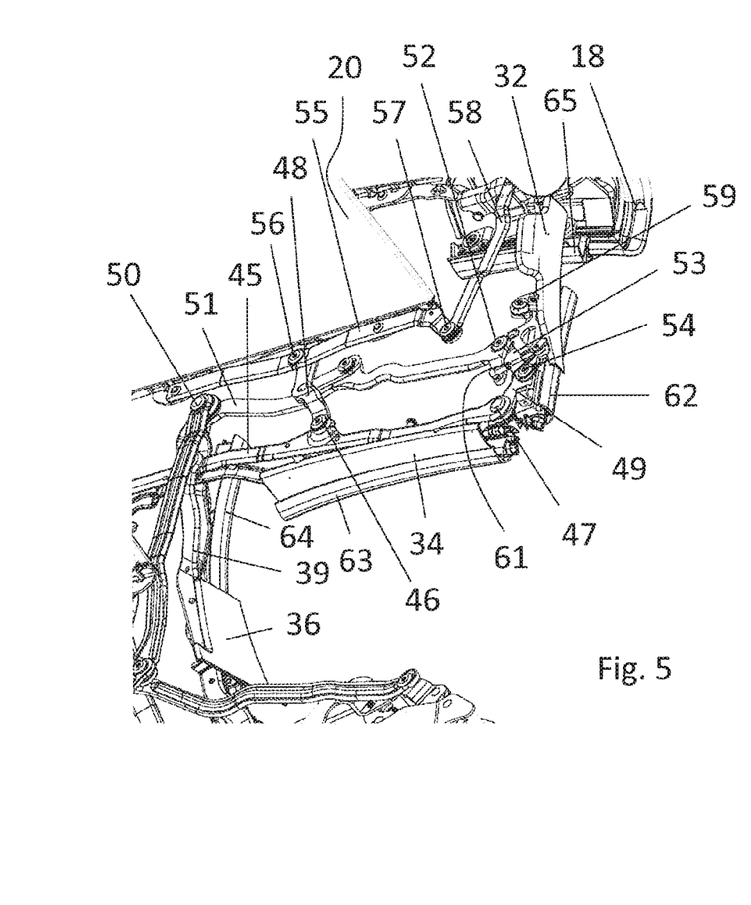
FIG. 5 is a view of the linkage assembly substantially corresponding to FIG. 4, but in an intermediate position during displacement of the top between the closed position and a storage position.

Furthermore, the headliner of the top 10 comprises a headliner assembly 28 on either side, each headliner assembly 28 covering the top linkage 14 at the inside in the area of the linkage assembly 16 when the top is in the closed position, as illustrated in FIG. 4, and comprising a headliner fabric 30, as can be seen in FIG. 6, which covers a front headliner flap 32, a middle supporting shell 34 and a rear headliner flap 36 and is attached thereto and can otherwise be kept in position by means of ropes (not shown).

The linkage assemblies 16 each comprise, as a main multi-bar assembly, a main four-bar linkage 38 having a first main link 39 and a second main link 41, each of which is pivotably mounted on a vehicle-attached main bearing 40 via a respective pivot point. For driving the main four-bar linkage 38 forming a main multi-bar assembly, a hydraulic cylinder 42 upon actuation of which main links 39 and 41 of the main four-bar linkage 38 are pivoted in relation to the main bearing 40 is provided in the area of the main bearing 40. The two main links 39 and 41 are connected to a roof middle link 45, which is part of a middle roof frame element, via points of articulation 43 and 44. Two front links 48 and 49, on whose ends facing away from pivot points 46 and 47 the panel bow 18 forming the front bow is pivotably mounted, are articulated to the roof middle link 45 in a middle portion and in a rear portion, respectively, via pivot points 46 and 47.

To be able to pivot the two front links 48 and 49 in relation to the roof middle link 45, a coupling link 51 is articulated to main link 39 via a point of articulation 50, said coupling link 51 being connected to a connecting link 53 via a pivot point 52, said connecting link 53 being articulated to front link 49, which forms a front roof link, via a point of articulation 54.

Panel bow 20, which forms the front middle bow, is mounted on a panel bow link 55 which is connected to front link 48 via a point of articulation 56 and to a control link 58 via a point of articulation 57, said control link 58 being connected to panel bow 18, which forms the front bow.

Panel bow 18 keeps its orientation during displacement of the top between the closed position and the storage position meaning the side of panel bow 18 that is disposed on top when the top 10 is in the closed position also forms the upper side of panel bow 18 when the top 10 is in the storage position. This means that the top 10 undergoes what is known as Z-folding when it is displaced between the closed position and the storage position. During displacement of the top 10 into the storage position, front link 49, which forms a front roof link, is pivoted in relation to panel bow 18 in such a manner that it is largely disposed forward thereof with respect to the longitudinal direction of the vehicle in question when the top 10 is in the storage position.

To make front link 49 accessible from above when the top 10 is in the storage position and to be able to keep front link 49 in position by means of, for example, a holding-down element disposed on a top storage box lid, the front headliner flap 32 can be shifted in the longitudinal direction and in the transverse direction with respect to the longitudinal direction of front link 49. To be able to perform this movement, the front headliner flap 32 is connected to front link 49 via a four-bar assembly. The four-bar assembly comprises two links 59 and 60 which are articulated to front link 49 at one side and to the front headliner flap 32 at the other side. The points of articulation of the two links 59 and 60 form pivot axes which are inclined diagonally in relation to a pivot axis formed between front link 49 and the roof middle link 45 by pivot point 47. In order for a defined relative position of the front headliner flap 32 in relation to front link 49 to be realized at all times during its displacement as a function of the position of the top 10, a coupling rod 61 is provided which is articulated to a protrusion of the coupling link 51 at one side via a spherical head and to the front headliner flap 32 at the other side. Alternatively, the coupling rod 61 could also be articulated to the coupling link 51 at one side and to one of the two links 59 and 60 of the four-bar linkage at the other side. This can lead to optimization of the displacing forces.

By means of the front headliner flap 32, in the area of front link 49, the headliner fabric 30 attached to the headliner flap 32 can be guided as far as to a side weather strip 62 disposed on front link 49 when the top 10 is in the closed position. Side weather strip 62 forms part of a lateral sealing system by means of which the top 10 can be sealed with respect to side windows of the vehicle in question when the top 10 is in its closed position. In addition to front side weather strip 62, the sealing system comprises a middle side weather strip 63, which is mounted on the roof middle link 45, and a rear side weather strip 64, which is mounted on a weather strip support which can be pivoted with main link 39. Additionally, the sealing system has yet another side weather strip 65, which is designed as a front bow weather strip. Side weather strips 62, 63, 64 and 65 are disposed in alignment one behind the other when the top 10 is in the closed position (cf. FIGS. 1 and 4).

The supporting shell 34 of the headliner assembly 28, which is also covered by the headliner fabric 30 and guides the latter as far outside as to side weather strip 30, is disposed rigidly in relation to the roof middle link 45. However, the rear headliner flap 36, which guides the headliner fabric 30 as far outside as to side weather strip 64 when the top 10 is in the closed position, is pivotably mounted on main link 39 via a simple articulation 66. The articulation 66 has a pivot axis that is inclined diagonally in relation to the pivot axes of main links 39 and 41. When the top 10 is pivoted from the closed position into the storage position, the rear headliner flap 36 is pivoted inward about the pivot axis formed by the articulation 66, allowing tensions introduced into the headliner fabric 30 to be compensated. When the top 10 is in the closed position, main link 41 forms a stop for the rear headliner flap 36, said stop keeping the rear headliner flap 36 in position, so that the headliner fabric 30 is guided toward side weather strip 64 in a defined manner.

The headliner fabric 30 can be glued or sewn to the headliner flaps 32 and 36, which are in particular made of plastic, and to the supporting shell 34, which is in particular made of plastic.

FIGS. 9 to 12 show a second embodiment of a top according to the invention. This top differs from the top illustrated in FIGS. 1 to 8 merely in that a front headliner flap 32' is connected to the top linkage. Otherwise, the top according to FIGS. 9 to 12 corresponds to the one according to FIGS. 1 to 8.

In correspondence to the embodiment described above, headliner flap 32' is articulated to front link 49 via two links 59 and 60, said front link 49 being articulated to the roof middle link 45 via pivot point 47. While the pivot axes of the points of articulation of links 59 and 60 to front headliner flap 32' and to front link 49 are parallel to each other, they are oriented obliquely in relation to the pivot axis formed by pivot point 47. Thus, front headliner flap 32' undergoes a longitudinal movement and a transverse movement in relation to front link 49 when the four-bar linkage formed by links 59 and 60 is actuated.

Link 59 of the four-bar linkage has a protrusion 67 to which a coupling rod 61 is articulated via a point of articulation 68, said coupling rod 61 being articulated in turn to the control link 58 for defined displacement of panel bow 20 via a point of articulation 69. The displacing force required to displace front headliner flap 32' in relation to front link 49 is thus introduced from links 59 and 60 into the four-bar linkage by control ink 58 via the coupling rod 61 when the top is being displaced. Thus, front headliner flap 32' can cover front link 49 from below when the top 10 is in the closed position (cf. FIG. 9) and uncover it at the top when the top 10 is in the storage position (cf. FIG. 11), allowing a top storage box lid or the like to exert a holding force on front link 49 from above by means of a holding-down element. In this way, the storage position of the top can be secured.

REFERENCE SIGNS 10 top
12 top cover 14 top linkage
16 linkage assembly
18 panel bow
20 panel bow
22 panel bow
24 panel bow
26 rear window
28 headliner assembly
30 headliner fabric
32, 32' front headliner flap
34 supporting shell
36 rear headliner flap
38 main four-bar linkage
39 main link
40 main bearing
41 main link
42 hydraulic cylinder
43 point of articulation
44 point of articulation
45 roof middle link
46 pivot point
47 pivot point
48 front link
49 front link
50 point of articulation
51 coupling link
52 point of articulation
53 connecting link
54 point of articulation
55 panel bow link
56 point of articulation
57 point of articulation
58 control link
59 link
60 link
61 coupling rod
62 side weather strip
63 side weather strip
64 side weather strip
65 side weather strip
66 articulation
67 protrusion
68 point of articulation

The invention claimed is:

1. A top of a convertible vehicle, comprising a top linkage which can be displaced between a closed position, in which the vehicle interior is covered, and a storage position, in which the vehicle interior is open at the top, and which has a linkage assembly on either side of a vertical longitudinal center plane of the top, each linkage assembly comprising a main multi-bar assembly, which is pivotably mounted on a respective vehicle-attached main bearing, and a front roof link, which pivots relative to the main multi-bar assembly when the linkage assembly is actuated, and each linkage assembly being covered by a headliner assembly when the top linkage is in the closed position, wherein the headliner assemblies each comprise a front headliner flap which is articulated to the respective front roof link via a link assembly and which can be pivoted, by an actuating element, between a covering position and an uncovering position, in which the front headliner flap is located when the top linkage is in the storage position and in which the respective front roof link is accessible from above.

2. The top according to claim 1, wherein the link assemblies each form a four-bar assembly whose pivot axes run obliquely in relation to a pivot axis of the respective front roof link, causing the respective headliner flap to be shifted in the longitudinal direction and in the transverse direction with respect to the front roof link when the top linkage is actuated.

3. The top according to claim 1, wherein the actuating elements each comprise a coupling rod.

4. The top according to claim 3, wherein each coupling rod is articulated to a coupling link for pivoting the front roof link.

5. The top according to claim 3, wherein the top linkage comprises panel bows and each coupling rod is connected to a control link for one of the panel bows.

6. The top according to claim 1, wherein the actuating elements each comprise a cable.

7. The top according to claim 1, wherein each headliner assembly comprises a second headliner flap which is pivotably mounted on the respective main multi-bar assembly and whose pivot axis runs preferably diagonally in relation to the pivot axes of the main multi-bar assemblies.

8. The top according to claim 1, wherein each headliner assembly comprises a supporting shell which is rigidly disposed on a respective middle roof link to which the front roof link is pivotably connected.

9. The top according to claim 1, wherein the front headliner flap is covered by a headliner fabric.

10. The top according to claim 1, wherein the front roof link is pivotably connected to a front bow whose upper side is disposed at the top when the top linkage is in the closed position and when the top linkage is in the storage position.

* * * * *